(12) United States Patent
Lai et al.

(10) Patent No.: US 9,829,677 B2
(45) Date of Patent: Nov. 28, 2017

(54) OPTICAL LENS

(71) Applicant: Young Optics Inc., Hsinchu (TW)

(72) Inventors: Ching-Lung Lai, Hsinchu (TW); Chen-Cheng Liao, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 15/170,913

(22) Filed: Jun. 1, 2016

(65) Prior Publication Data

US 2017/0153415 A1 Jun. 1, 2017

(30) Foreign Application Priority Data

Nov. 27, 2015 (TW) .............................. 104139618 A (51) Int. Cl.
  *G02B 13/18* (2006.01)
  *G02B 3/02* (2006.01)
  *G02B 9/60* (2006.01)

(52) U.S. Cl.
  CPC ............... *G02B 9/60* (2013.01); *G02B 13/18* (2013.01)

(58) Field of Classification Search
  CPC ........... G02B 9/60; G02B 1/041; G02B 13/18
  USPC ......................................... 359/714, 753, 770
  See application file for complete search history.

(56) References Cited

U.S. PATENT DOCUMENTS

| 5,703,726 A | 12/1997 | Griffith |
| 6,075,658 A | 6/2000 | Nagahara |
| 6,417,975 B1 | 7/2002 | Isono |
| 6,825,993 B2 | 11/2004 | Noda |
| 2017/0017065 A1* | 1/2017 | Liu et al. ........... G02B 13/0045 |

FOREIGN PATENT DOCUMENTS

| CN | 1258853 | 7/2000 |
| CN | 1246720 | 3/2006 |
| TW | 201314252 | 4/2013 |
| TW | 201317610 | 5/2013 |
| TW | I421533 | 1/2014 |
| TW | I429980 | 3/2014 |
| TW | I440883 | 6/2014 |
| TW | I443409 | 7/2014 |
| TW | I447427 | 8/2014 |

* cited by examiner

*Primary Examiner* — Alicia M Harrington
(74) *Attorney, Agent, or Firm* — JCIPRNET (57) ABSTRACT

An optical lens including a first lens group located between a magnified side and a minified side and a second lens group between the first lens group and the minified side is provided. The first lens group has a negative power and includes a first lens. The first lens is a plastic aspheric and meniscus lens. Besides, the first lens has a negative power and a convex surface facing the magnified side. The second lens group has a positive power and includes a second lens, a third lens having a negative power, and a fourth lens. Every two of the second, third, and fourth lenses have an air interval between these lenses. The Abbe number of each of at least three of the lenses is greater than 20. A material of at least one of the lenses is glass. At least one of the lenses is a spherical lens.

20 Claims, 8 Drawing Sheets

FIG. 4D

OPTICAL LENS

CROSS-REFERENCE TO RELATED APPLICATION

This application claims the priority benefit of Taiwan application serial no. 104139618, filed on Nov. 27, 2015. The entirety of the above-mentioned patent application is hereby incorporated by reference herein and made a part of this specification.

FIELD OF INVENTION

The invention relates to an optical device; more particularly, the invention relates to an optical lens.

DESCRIPTION OF RELATED ART

With the development of modern video technology, image apparatuses including digital video cameras (DVC) and digital cameras (DC) have been widely used in a variety of fields. One of the core elements of the image apparatuses is a lens, which is used for forming clear images on a screen or a charge coupled device (CCD). Besides, smart home surveillance camcorders have become more and more popular, and people become more and more demanding as to slimness and favorable optical performance of the image apparatuses. The lens satisfying said requirements need be characterized by low costs, miniaturization, slimness, high resolution capability, large stop aperture, little distortion, 24-hour day and night confocal image-capturing quality, and so on.

Hence, how to manufacture a lens that has said advantages and satisfactory optical quality without increasing the manufacturing costs is one of the most important topics in the pertinent field.

SUMMARY OF THE INVENTION

An embodiment of the invention is directed to an optical lens characterized by low manufacturing costs and favorable optical quality.

In an embodiment of the invention, an optical lens that includes a first lens goup, a second lens group, and a stop is provided. The first lens group is located between a magnified side and a minified side. The first lens group has a negative power and includes a first lens. The first lens is a plastic aspheric and meniscus lens. Besides, the first lens has a negative power and a convex surface facing the magnified side. The second lens group is located between the first lens group and the minified side. The second lens group has a positive power and includes a second lens, a third lens having a negative power, and a fourth lens. Every two of the second, the third, and the fourth lenses have an air interval therebetween. The stop is located between the first lens group and the second lens group. The optical lens satisfies 2<L/D<4. Here, L is a total track length of the optical lens, and D is a length of a diagonal of an image sensor. An Abbe number of each of at least three of the lenses of the optical lens is greater than 20, a material of at least one of the lenses is glass, and at least one of the lenses is a spherical lens.

In view of the above, the design of the optical lens provided in an embodiment of the invention satisfies the predetermined requirements for low costs, miniaturization, slimness, high resolution capability, large stop aperture, little distortion, 24-hour day and night confocal image-capturing quality, and favorable optical quality.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EXEMPLARY EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Accordingly, the drawings and descriptions will be regarded as illustrative in nature and not as restrictive.

Figure 1A:
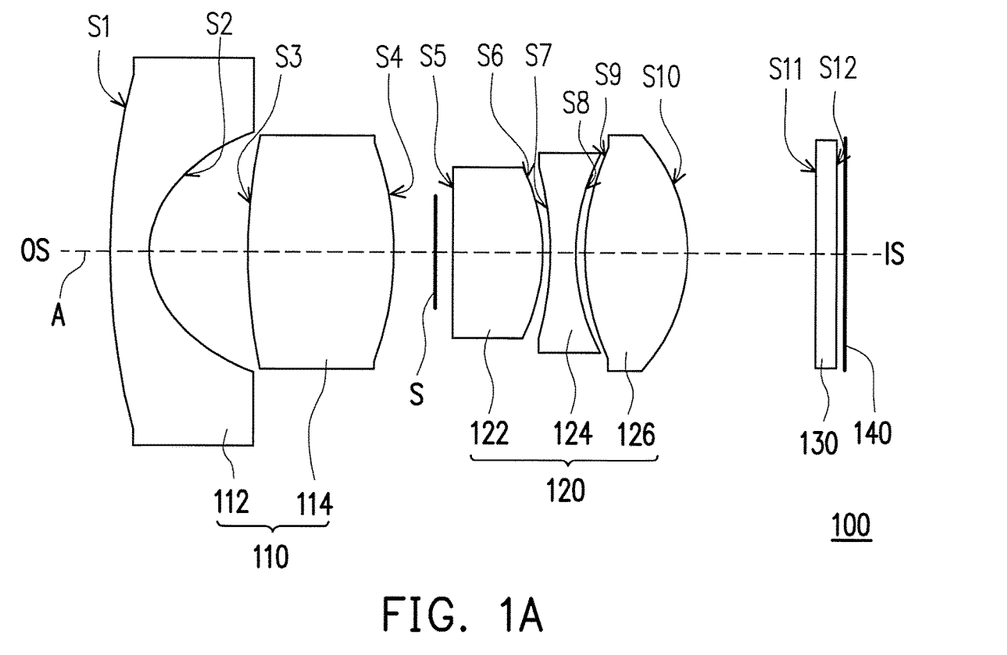
FIG. 1A is a schematic view briefly illustrating an optical lens according to an embodiment of the invention.

FIG. 1A is a schematic view briefly illustrating an optical lens according to an embodiment of the invention. With reference to FIG. 1A, the optical lens 100 provided in the present embodiment is located between a magnified side (an object side) and a minified side (an image side). The optical lens 100 includes a first lens group 110 having a negative refractive power, a second lens group 120 having a positive refractive power, and a stop S. The first lens group 110 is located between a magnified side OS and the stop S. The second lens group 120 is located between the stop S and a minified side IS. In the present embodiment, the first lens group 110 includes a first lens (L1) 112 having a negative refractive power and a fifth lens (L5) 114 having a positive refractive power from the magnified side OS to the minified side IS. The second lens group 120 includes a second lens (L2) 122 having a positive refractive power, a third lens (L3) 124 having a negative refractive power, and a fourth lens (L4) 126 having a positive refractive power sequentially from the magnified side OS to the minified side IS.

In the present embodiment, the first lens 112 has a convex surface S1 facing the magnified side OS. The second lens 122 has a plane S5 facing the magnified side OS. The fifth lens 114 is a biconvex lens. In the present embodiment, the first lens, the fifth lens, the third lens, and the fourth lens are aspheric lenses. At least three of the first lens, the third lens, the fourth lens, and the fifth lens are plastic lenses. For instance, the first lens, the third lens, the fourth lens, and the fifth lens are plastic lenses, and the second lens 122 is a glass lens. The Abbe number of each of at least three of the first lens, the second lens, the third lens, the fourth lens, and the fifth lens is greater than 20.

In the present embodiment, the optical lens 100 satisfies the following conditions (1)-(4).

$$2 < L/D < 4 \quad (1)$$

$$F < 2.5 \quad (2)$$

$$L < 20 \text{ mm} \quad (3)$$

$$0 \text{ mm} \leq t < 0.02 \text{ mm} \quad (4)$$

Here, L is the total track length of the optical lens 100, i.e., the distance from the surface Si of the first lens 112 on an optical axis A to an imaging plane 140 of an image sensor, D is a length of a diagonal of the imaging plane 140 of the image sensor, F is the F-number of the lens, and t is a focal shift of the optical lens 100 relative to a visible light and a near-infrared light. The optical lens 100 has a focal length relative to the visible light and has another focal length relative to the near-infrared light. The distance between the two focal points is the focal shift of the optical lens 100 relative to the visible light and the near-infrared light having the wavelength of 850 nanometers (nm). Thereby, as long as the optical lens 100 satisfies said conditions, the optical imaging quality and the favorable optical characteristics of the optical lens 100 can be guaranteed. In the present embodiment, the focal shift of the optical lens 100 relative to the visible light and the near-infrared light having the wavelength of 850 nm is not significant, which can be referred to as having the 24-hour day and night confocal image-capturing quality.

Additionally, according to the present embodiment, a glass cover 130 and the image sensor can be arranged at the minified side IS, and the imaging plane at the minified side IS is 140. The glass cover 130 is located between the second lens group 120 and the imaging plane 140. Besides, the glass cover 130 has two surfaces S11 and S12, and the optical lens 100 creates images on the imaging plane 140.

Specific data of each lens in the optical lens 100 depicted in FIG. 1A are provided below.

TABLE 1

| Surface | Curvature Radius (mm) | Interval (mm) | Refractive index | Abbe Number | Notes |
|---|---|---|---|---|---|
| S1 | 6.07 | 0.78 | 1.53 | 56.28 | L1 |
| S2 | 1.45 | 2.11 | | | |
| S3 | 124.83 | 2.70 | 1.64 | 23.97 | L5 |
| S4 | −4.48 | 0.81 | | | |
| S | infinite | 0.10 | | | Stop |
| S5 | infinite | 2.05 | 1.73 | 54.68 | L2 |
| S6 | −2.84 | 0.10 | | | |
| S7 | −1.85 | 0.55 | 1.64 | 23.97 | L3 |
| S8 | 10.64 | 0.10 | | | |
| S9 | 3.13 | 2.16 | 1.53 | 56.28 | L4 |
| S10 | −2.70 | 3.69 | | | |
| S11 | infinite | 0.7 | 1.52 | 64.17 | Glass cover |
| S12 | infinite | 0.01 | | | |

In Table 1, the interval represents a linear distance between two adjacent surfaces on the optical axis A. For instance, the interval of the surface S1 represents the linear distance between the surface S1 and the surface S2 on the optical axis A. The thickness, the refractive index, and the Abbe number corresponding to each lens are recited in Table 1, and the corresponding lenses are recited in the Notes column. Besides, in Table 1, the surfaces S1 and S2 are two surfaces of the first lens 112, the surfaces S3 and S4 are two surfaces of the fifth lens 114, the surfaces S5 and S6 are two surfaces of the second lens 122, the surfaces S7 and S8 are two surfaces of the third lens 124, and the surfaces S9 and S10 are two surfaces of the fourth lens 126.

The surfaces S1, S2, S3, S4, S7, S8, S9, and S10 are aspheric surfaces and may be expressed by the following formula (1):

$$Z = \frac{cr^2}{1 + \sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} + \ldots \quad (1)$$

In the formula (1), Z is a sag in the direction of the optical axis A, and c is the reciprocal of the radius of an osculating sphere, i.e., the reciprocal of the curvature radius (e.g., the curvature radii of the surfaces S1 to S4 and the surfaces S7 to S10 in Table 1) close to the optical axis A; k is a conic coefficient, r is the height of the aspheric surface, i.e., the height from the center of the lens to the edge of the lens, $A_2$, $A_4$, $A_6$, $A_8$, $A_{10}$, $A_{12}$, $A_{14}$, $A_{16}$ . . . are aspheric coefficients, and the coefficient $A_2$ is zero according to the present embodiment of the invention. The parameters of the surfaces S1 to S4 and the surfaces S7 to S10 in the optical lens 100 are listed in Table 2.

TABLE 2

| Aspheric Coefficient | Conic Coefficient k | Coefficient $A_4$ | Coefficient $A_6$ | Coefficient $A_8$ |
|---|---|---|---|---|
| S1 | 0 | 5.477E−03 | −2.731E−03 | 4.279E−04 |
| S2 | −0.642 | 1.531E−02 | −3.000E−03 | −1.818E−03 |
| S3 | 0 | −1.933E−04 | −2.153E−03 | 7.752E−04 |
| S4 | 0 | 3.790E−03 | −4.249E−03 | 3.005E−03 |

TABLE 2-continued

| | | | | |
|---|---|---|---|---|
| S7 | 0 | 9.753E-02 | -6.927E-02 | 4.225E-02 |
| S8 | 0 | 6.048E-02 | -7.285E-02 | 4.910E-02 |
| S9 | 0 | -2.734E-02 | -1.281E-02 | 1.251E-02 |
| S10 | 0 | 6.355E-03 | -4.401E-04 | 5.980E-05 |

| Aspheric Coefficient | Coefficient $A_{10}$ | Coefficient $A_{12}$ | Coefficient $A_{14}$ | Coefficient $A_{16}$ |
|---|---|---|---|---|
| S1 | -3.463E-05 | 1.240E-06 | 1.846E-09 | -9.068E-10 |
| S2 | 5.663E-04 | -9.721E-06 | -9.011E-06 | 0 |
| S3 | -1.391E-04 | 4.881E-06 | -3.224E-07 | 0 |
| S4 | -1.244E-03 | 2.579E-04 | -2.138E-05 | 0 |
| S7 | -1.225E-02 | 7.443E-04 | 2.490E-04 | 0 |
| S8 | -1.744E-02 | 3.063E-03 | -2.099E-04 | 0 |
| S9 | -4.171E-03 | 6.228E-04 | -3.562E-05 | 0 |
| S10 | -1.695E-05 | 1.305E-05 | -1.656E-06 | 0 |

In the optical lens 100 provided herein, the effective focal length (EFL) of the optical lens 100 relative to the visible light is 2.345 mm, the EFL of the optical lens 100 relative to the near-infrared light having the wavelength of 850 nm is 2.35 mm, the F-number (Fno) is 2.1, the field of view (FOV) is 90.5 degrees, the imaging height IH is 2.264 mm, and the total track length (TTL) is 15.86 mm.

Figure 1B:
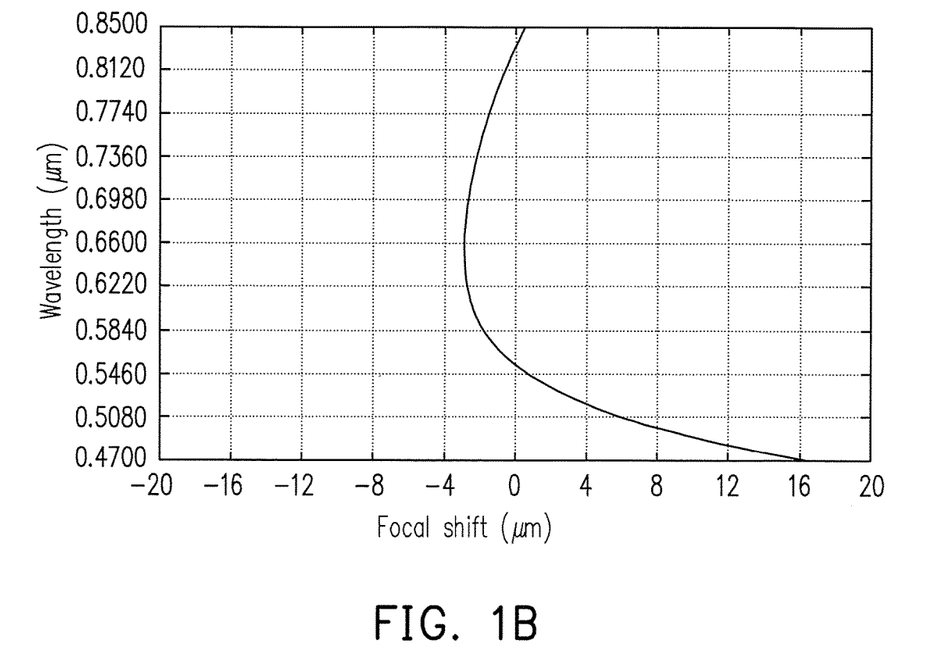
FIG. 1B, FIG. 1C, and FIG. 1D illustrate optical simulation data of imaging of the optical lens in FIG. 1A.
Figure 1C:
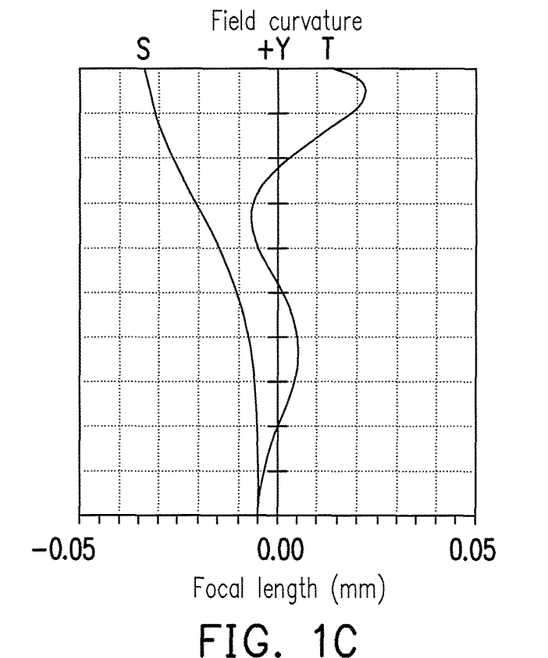
Figure 1D:
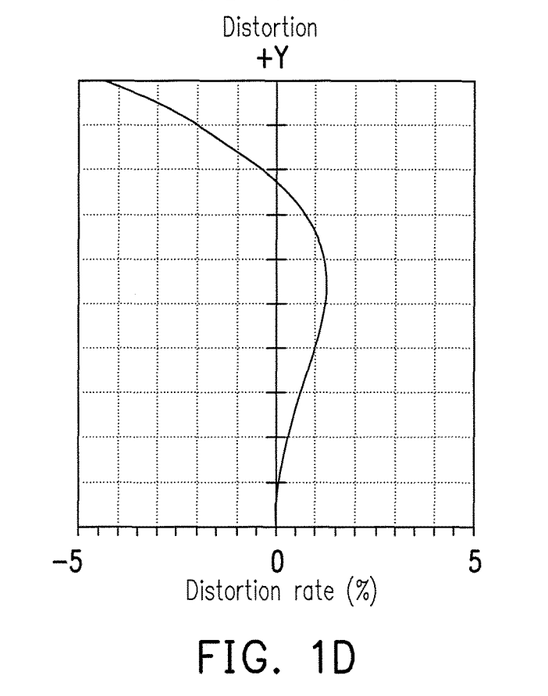

FIG. 1B, FIG. 1C, and FIG. 1D illustrate optical simulation data of imaging of the optical lens 100 in FIG. 1A. In FIG. 1B, the focal shift of the optical lens 100 relative to different wavelengths of light is shown. FIG. 1C and FIG. 1D respectively illustrate graphics of field curvature and distortion simulated with a light having wavelength of 555 nm.

Reference numbers and some descriptions provided in the previous embodiments are also applied in the following embodiments. The same reference numbers represent the same or similar components in this and the previous embodiments, and repetitive descriptions are omitted. The omitted descriptions may be found in the previous exemplary embodiments.

Figure 2A:
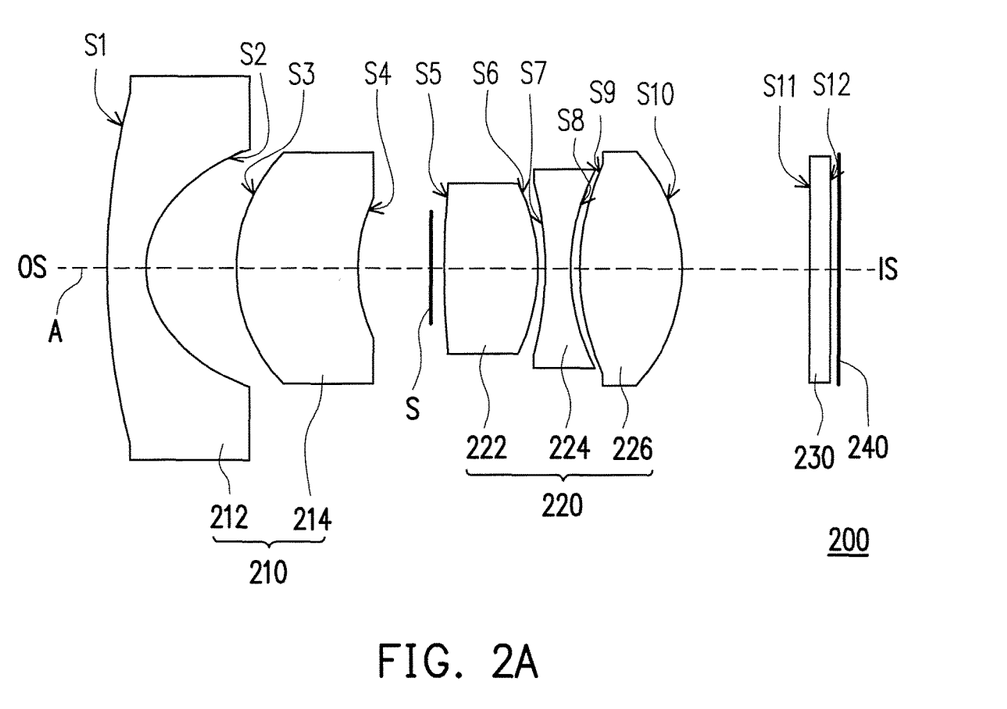
FIG. 2A is a schematic view briefly illustrating an optical lens according to another embodiment of the invention.

FIG. 2A is a schematic view briefly illustrating an optical lens according to another embodiment of the invention. With reference to FIG. 1A and FIG. 2A, the optical lens 200 provided in the present embodiment is similar to the optical lens 100 provided in the embodiment shown in FIG. 1A, and the differences there between lie in that the second lens 222 having a convex surface S5 facing the magnified side OS, the fifth lens 214 is a convex-concave lens, and a surface S4 of the fifth lens 214 facing the minified side IS is a concave lens.

Specific data of each lens in the optical lens 200 depicted in FIG. 2A are provided below.

TABLE 3

| Surface | Curvature Radius (mm) | Interval (mm) | Refractive index | Abbe Number | Notes |
|---|---|---|---|---|---|
| S1 | 7.18 | 0.82 | 1.54 | 56.09 | L1 |
| S2 | 1.51 | 1.64 | | | |
| S3 | 3.75 | 2.46 | 1.64 | 23.97 | L2 |
| S4 | 5.24 | 1.52 | | | |
| S | infinite | 0.31 | | | Stop |
| S5 | 17.47 | 1.82 | 1.73 | 54.68 | L3 |
| S6 | -3.81 | 0.10 | | | |
| S7 | -41.32 | 0.55 | 1.64 | 23.97 | L4 |
| S8 | 2.80 | 0.12 | | | |
| S9 | 3.70 | 2.07 | 1.54 | 56.09 | L5 |
| S10 | -2.78 | 3.69 | | | |
| S11 | infinite | 0.7 | 1.52 | 64.17 | Glass cover |
| S12 | infinite | 0.10 | | | |

The way to interpret the data and the optical parameters in Table 3 is similar to that in Table 1 and thus will not be repeated hereinafter. In the present embodiment, the surfaces S1, S2, S3, S4, S7, S8, S9, and S10 are aspheric surfaces and may be expressed by the above-mentioned formula (1). The parameters of the surfaces S1 to S4 and the surfaces S7 to S10 in the optical lens 200 are listed in Table 4.

TABLE 4

| Aspheric Coefficient | Conic Coefficient k | Coefficient $A_4$ | Coefficient $A_6$ | Coefficient $A_8$ |
|---|---|---|---|---|
| S1 | 0 | -3.668E-03 | -2.312E-04 | 5.242E-05 |
| S2 | -0.707 | -3.376E-03 | -2.696E-03 | 4.296E-04 |
| S3 | 0 | 3.653E-03 | 4.254E-04 | 1.041E-04 |
| S4 | 0 | 1.156E-02 | 8.367E-03 | -5.869E-03 |
| S7 | 0 | -3.351E-02 | 8.719E-03 | -1.669E-03 |
| S8 | 0 | -4.441E-02 | 1.165E-02 | -3.213E-03 |
| S9 | 0 | -1.108E-02 | 2.473E-04 | 2.505E-04 |
| S10 | 0 | 8.303E-03 | -5.352E-04 | 5.341E-04 |

| Aspheric Coefficient | Coefficient $A_{10}$ | Coefficient $A_{12}$ | Coefficient $A_{14}$ | Coefficient $A_{16}$ |
|---|---|---|---|---|
| S1 | -3.997E-06 | 1.554E-07 | -3.145E-09 | 2.815E-11 |
| S2 | -1.743E-04 | 3.806E-05 | -3.157E-06 | 0 |
| S3 | -7.098E-05 | 1.845E-05 | -1.399E-06 | 0 |
| S4 | 2.927E-03 | -4.172E-04 | 1.495E-18 | 0 |
| S7 | 1.471E-04 | 3.716E-09 | 1.827E-16 | 0 |
| S8 | 6.909E-04 | -1.030E-04 | 6.862E-06 | 0 |
| S9 | -6.300E-05 | 5.328E-06 | -3.247E-07 | 0 |
| S10 | -1.697E-04 | 3.009E-05 | -2.004E-06 | 0 |

In the optical lens 200 provided herein, the EFL of the optical lens 200 relative to the visible light is 2.353 mm, the EFL of the optical lens 200 relative to the near-infrared light having the wavelength of 850 nm is 2.364 mm, the F-number is 2.0, the FOV is 90 degrees, the imaging height IH is 2.264 mm, and the TTL is 15.9 mm.

Figure 2B:
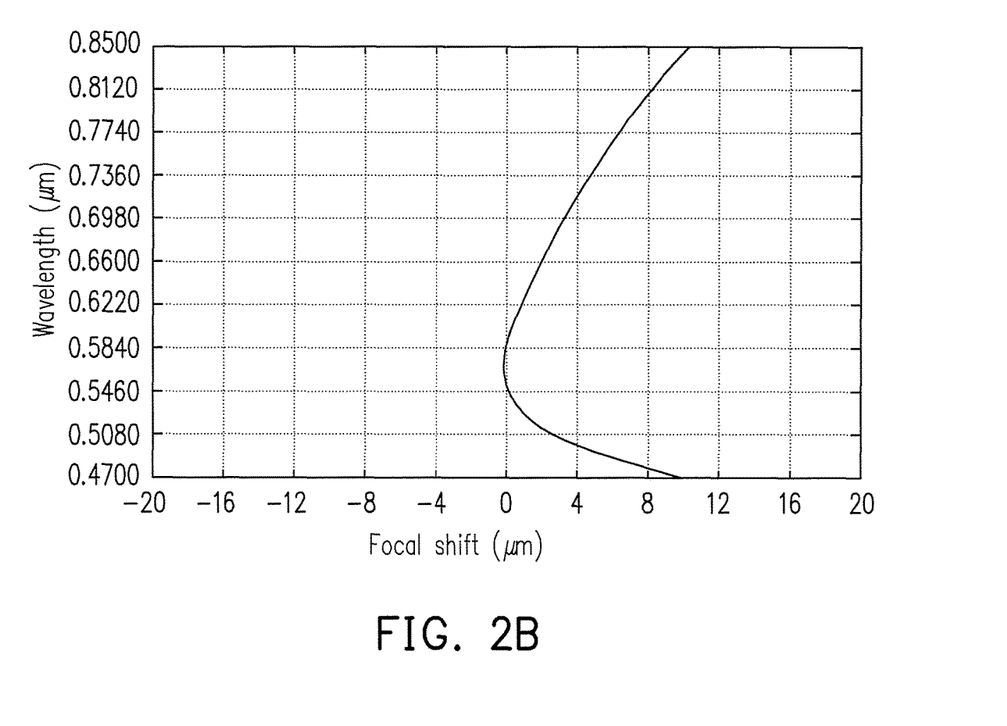
FIG. 2B, FIG. 2C, and FIG. 2D illustrate optical simulation data of imaging of the optical lens in FIG. 2A.
Figure 2C:
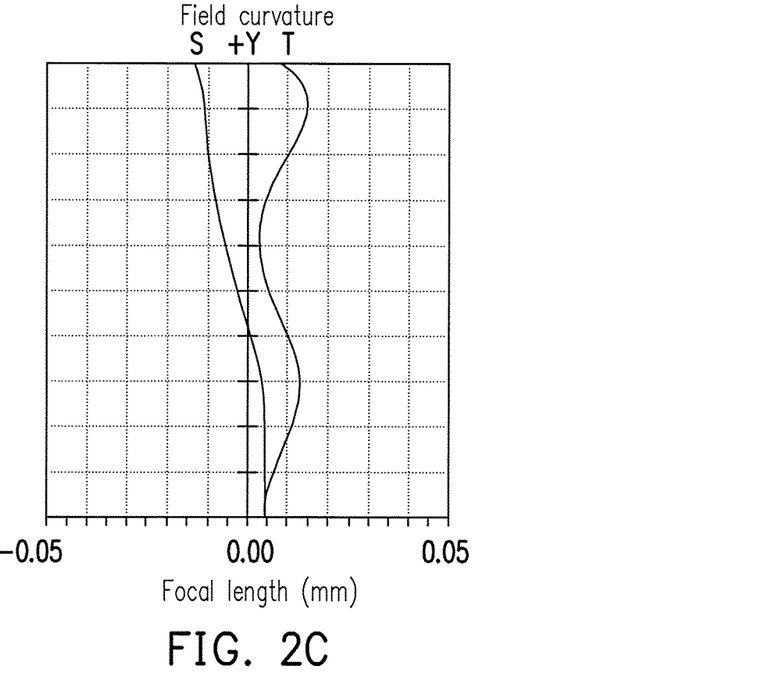
Figure 2D:
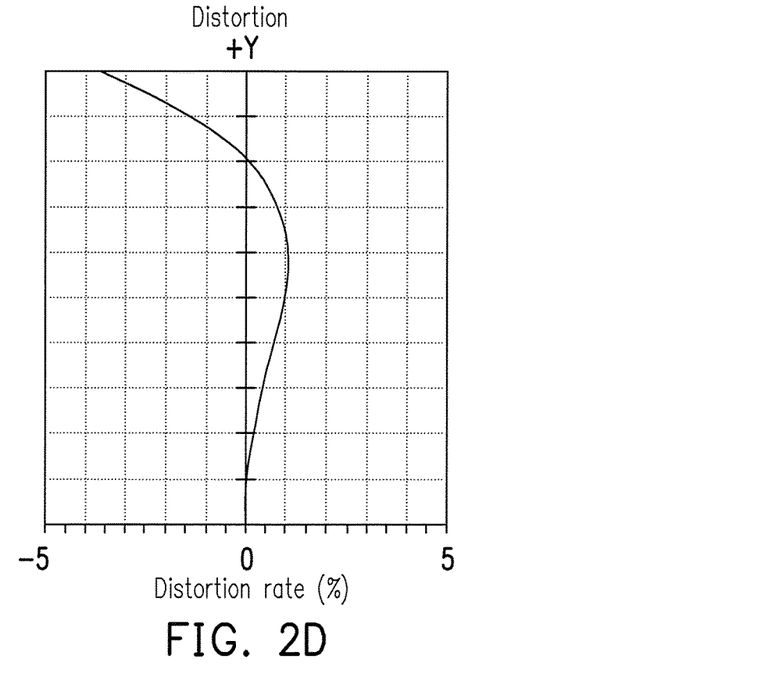

FIG. 2B, FIG. 2C, and FIG. 2D illustrate optical simulation data of imaging of the optical lens 200 in FIG. 2A. In FIG. 2B, the focal shift of the optical lens 200 relative to different wavelengths of light is shown. FIG. 2C and FIG. 2D respectively illustrate graphics of field curvature and distortion simulated with a light having wavelength of 555 nm.

Figure 3A:
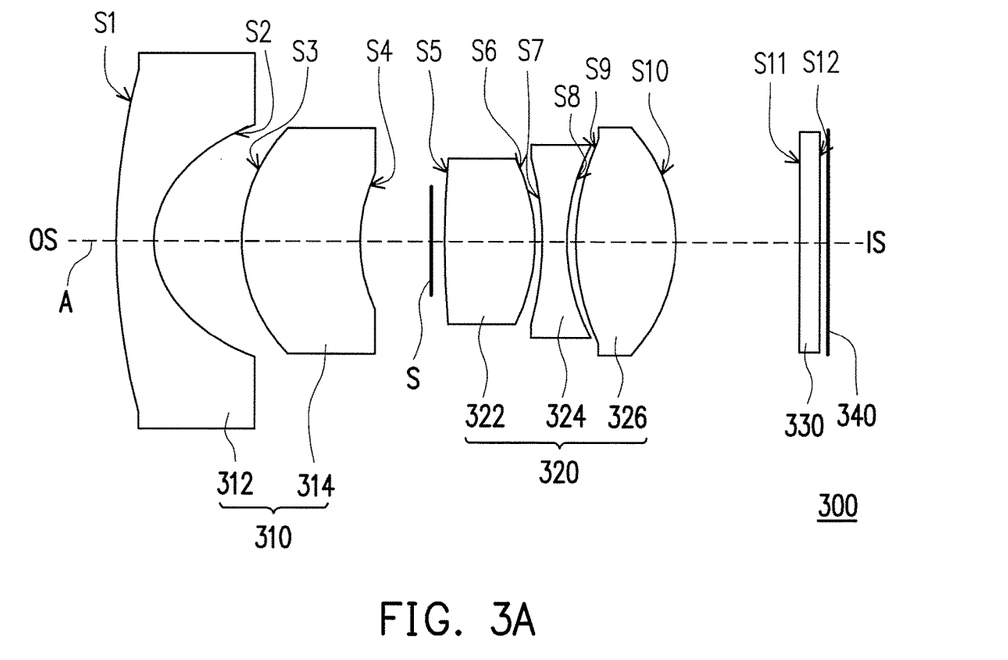
FIG. 3A is a schematic view briefly illustrating an optical lens according to another embodiment of the invention.

FIG. 3A is a schematic view briefly illustrating an optical lens according to another embodiment of the invention. With reference to FIG. 2A and FIG. 3A, the optical lens 300 provided in the present embodiment is similar to the optical lens 200 provided in the embodiment shown in FIG. 2A.

Specific data of each lens in the optical lens 300 depicted in FIG. 3A are provided below.

TABLE 5

| Surface | Curvature Radius (mm) | Interval (mm) | Refractive index | Abbe Number | Notes |
|---|---|---|---|---|---|
| S1 | 7.23 | 0.80 | 1.54 | 56.09 | L1 |
| S2 | 1.51 | 1.78 | | | |
| S3 | 3.86 | 2.40 | 1.64 | 23.97 | L5 |
| S4 | 5.46 | 1.47 | | | |
| S | Infinite | 0.28 | | | Stop |
| S5 | 15.53 | 1.85 | 1.70 | 55.53 | L2 |
| S6 | -3.74 | 0.10 | | | |
| S7 | 248.06 | 0.55 | 1.64 | 23.97 | L3 |
| S8 | 2.59 | 0.14 | | | |
| S9 | 3.66 | 2.04 | 1.54 | 56.09 | L4 |
| S10 | -2.80 | 3.69 | | | |
| S11 | Infinite | 0.7 | 1.52 | 64.17 | Glass cover |
| S12 | Infinite | 0.10 | | | |

The way to interpret the data and the optical parameters in Table 5 is similar to that in Table 1 and thus will not be repeated hereinafter. In the present embodiment, the surfaces S1, S2, S3, S4, S7, S8, S9, and S10 are aspheric surfaces and may be expressed by the above-mentioned formula (1). The parameters of the surfaces S1 to S4 and the surfaces S7 to S10 in the optical lens 300 are listed in Table 6.

TABLE 6

| Aspheric Coefficient | Conic Coefficient k | Coefficient $A_4$ | Coefficient $A_6$ | Coefficient $A_8$ |
|---|---|---|---|---|
| S1 | 0 | −2.390E−03 | −4.402E−04 | 6.820E−05 |
| S2 | −0.699 | −1.551E−03 | −2.148E−03 | −6.376E−06 |
| S3 | 0 | 3.784E−03 | 4.790E−04 | 7.925E−05 |
| S4 | 0 | 1.111E−02 | 7.966E−03 | −5.638E−03 |
| S7 | 0 | −3.854E−02 | 1.018E−02 | −1.880E−03 |
| S8 | 0 | −5.247E−02 | 1.397E−02 | −3.872E−03 |
| S9 | 0 | −1.122E−02 | 3.365E−04 | 2.375E−04 |
| S10 | 0 | 8.120E−03 | −4.452E−04 | 4.923E−04 |

| Aspheric Coefficient | Coefficient $A_{10}$ | Coefficient $A_{12}$ | Coefficient $A_{14}$ | Coefficient $A_{16}$ |
|---|---|---|---|---|
| S1 | −4.323E−06 | 1.188E−07 | −5.164E−10 | −2.380E−11 |
| S2 | −7.217E−05 | 2.832E−05 | −2.994E−06 | 0 |
| S3 | −5.864E−05 | 1.722E−05 | −1.419E−06 | 0 |
| S4 | 2.879E−03 | −4.172E−04 | 1.252E−18 | 0 |
| S7 | 1.569E−04 | 3.716E−09 | 1.442E−16 | 0 |
| S8 | 7.863E−04 | −1.106E−04 | 6.862E−06 | 0 |
| S9 | −6.610E−05 | 5.840E−06 | −3.247E−07 | 0 |
| S10 | −1.611E−04 | 2.922E−05 | −2.009E−06 | 0 |

In the optical lens 300 provided herein, the EFL of the optical lens 300 relative to the visible light is 2.375 mm, the EFL of the optical lens 300 relative to the near-infrared light having the wavelength of 850 nm is 2.385 mm, the F-number is 2.0, the FOV is 90 degrees, the imaging height IH is 2.264 mm, and the TTL is 15.9 mm.

Figure 3B:
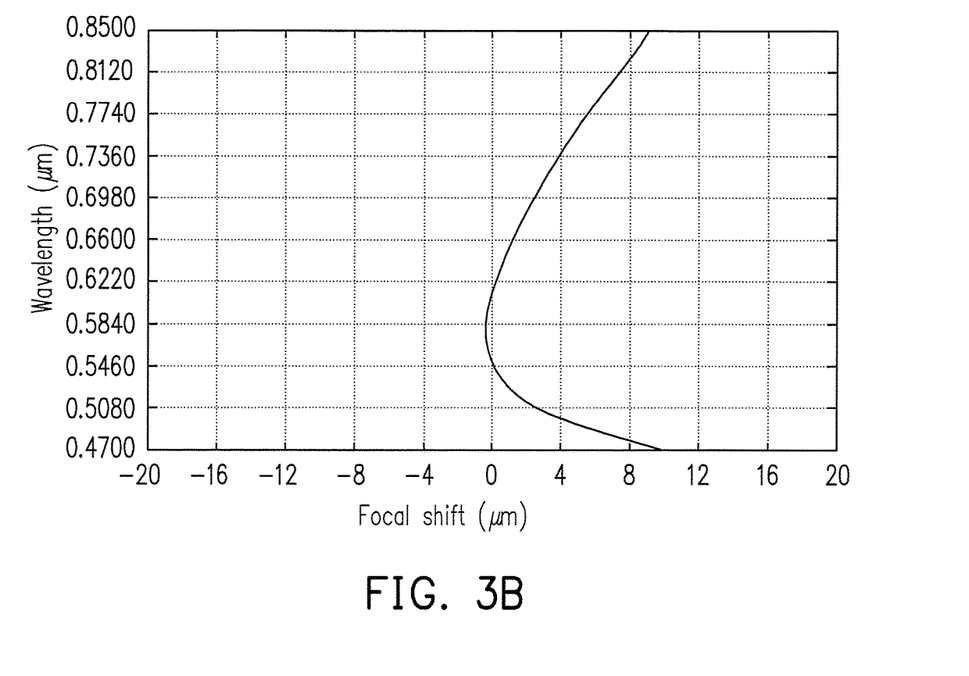
FIG. 3B, FIG. 3C, and FIG. 3D illustrate optical simulation data of imaging of the optical lens in FIG. 3A.
Figure 3C:
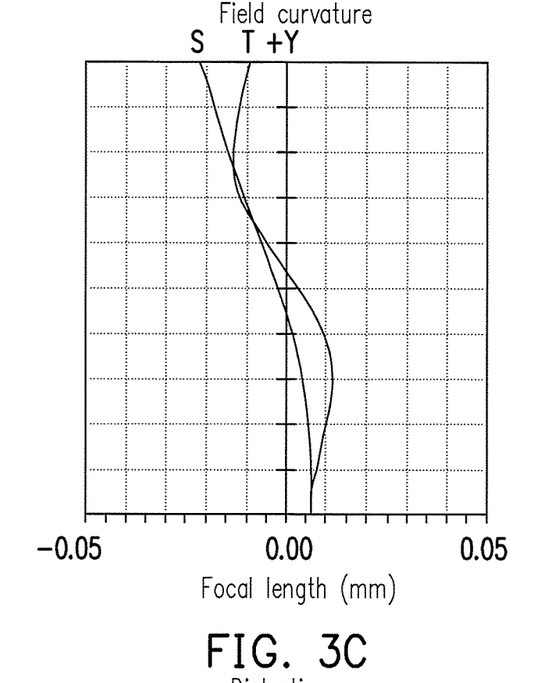
Figure 3D:
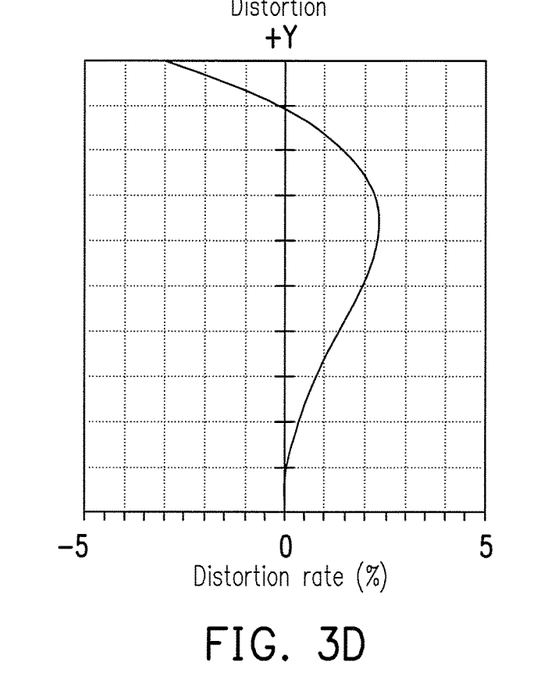

FIG. 3B, FIG. 3C, and FIG. 3D illustrate optical simulation data of imaging of the optical lens 300 in FIG. 3A. In FIG. 3B, the focal shift of the optical lens 300 relative to different wavelengths of light is shown. FIG. 3C and FIG. 3D respectively illustrate graphics of field curvature and distortion simulated with a light having wavelength of 555 nm.

Figure 4A:
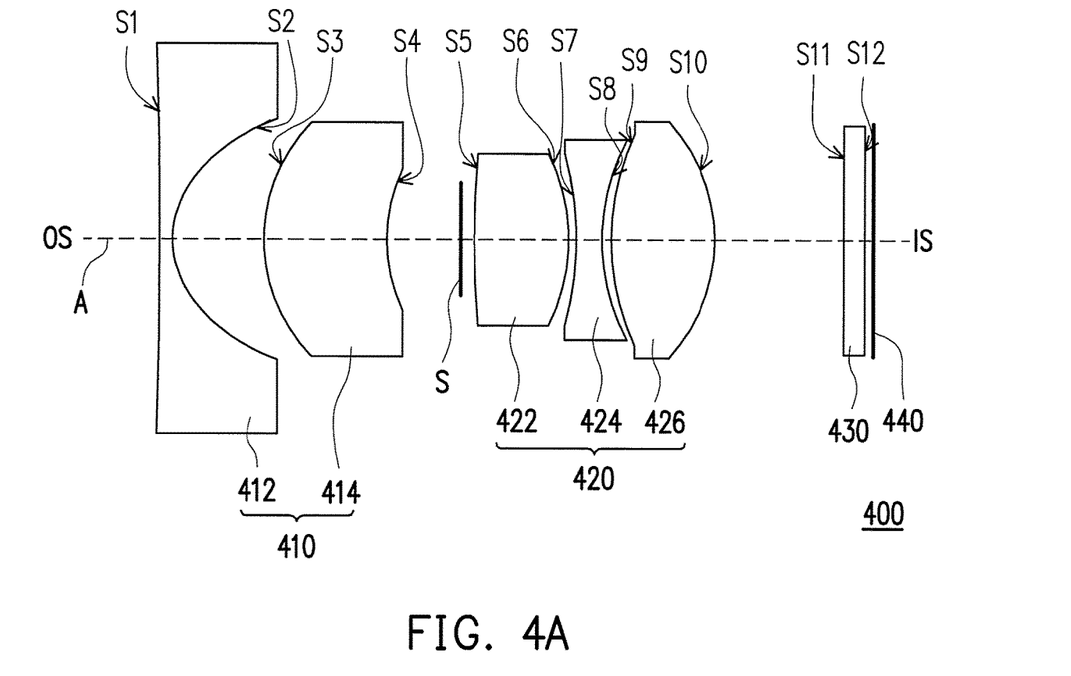
FIG. 4A is a schematic view briefly illustrating an optical lens according to another embodiment of the invention.

FIG. 4A is a schematic view briefly illustrating an optical lens according to another embodiment of the invention. With reference to FIG. 3A and FIG. 4A, the optical lens 400 provided in the present embodiment is similar to the optical lens 300 provided in the embodiment shown in FIG. 3A, and the differences therebetween lie in that the first lens 412 has a concave surface Si facing the magnified side OS.

Specific data of each lens in the optical lens 400 depicted in FIG. 4A are provided below. Note that the invention is not limited to the data listed in Tables 1-8. It should be known to those having ordinary skill in the pertinent art that various modifications and variations can be made to the parameters or settings provided herein without departing from the scope or spirit of the invention.

TABLE 7

| Surface | Curvature Radius (mm) | Interval (mm) | Refractive index | Abbe Number | Notes |
|---|---|---|---|---|---|
| S1 | −13.08 | 0.90 | 1.54 | 56.09 | L1 |
| S2 | 2.30 | 1.21 | | | |
| S3 | 3.58 | 2.73 | 1.64 | 23.97 | L5 |
| S4 | 5.39 | 1.50 | | | |
| S | Infinite | 0.34 | | | Stop |

TABLE 7-continued

| Surface | Curvature Radius (mm) | Interval (mm) | Refractive index | Abbe Number | Notes |
|---|---|---|---|---|---|
| S5 | 22.58 | 1.81 | 1.75 | 52.32 | L2 |
| S6 | −3.78 | 0.10 | | | |
| S7 | 90.08 | 0.55 | 1.64 | 23.97 | L3 |
| S8 | 2.54 | 0.15 | | | |
| S9 | 3.95 | 2.10 | 1.54 | 56.09 | L4 |
| S10 | −2.65 | 3.69 | | | |
| S11 | Infinite | 0.7 | 1.52 | 64.17 | Glass cover |
| S12 | Infinite | 0.10 | | | |

The way to interpret the data and the optical parameters in Table 7 is similar to that in Table 1 and thus will not be repeated hereinafter. In the present embodiment, the surfaces S1, S2, S3, S4, S7, S8, S9, and S10 are aspheric surfaces and may be expressed by the above-mentioned foimula (1). The parameters of the surfaces S1 to S4 and the surfaces S7 to S10 in the optical lens 400 are listed in Table 8.

TABLE 8

| Aspheric Coefficient | Conic Coefficient k | Coefficient $A_4$ | Coefficient $A_6$ | Coefficient $A_8$ |
|---|---|---|---|---|
| S1 | 0 | 1.035E−02 | −1.401E−03 | 1.068E−04 |
| S2 | −0.390 | −4.816E−03 | 3.148E−03 | −7.769E−04 |
| S3 | 0 | −5.574E−03 | 3.227E−03 | −4.882E−04 |
| S4 | 0 | 9.491E−03 | 1.339E−02 | −8.561E−03 |
| S7 | 0 | −4.378E−02 | 1.175E−02 | −1.956E−03 |
| S8 | 0 | −5.976E−02 | 1.718E−02 | −4.966E−03 |
| S9 | 0 | −1.069E−02 | 9.620E−04 | 1.399E−05 |
| S10 | 0 | 9.818E−03 | −1.859E−04 | 4.355E−04 |

| Aspheric Coefficient | Coefficient $A_{10}$ | Coefficient $A_{12}$ | Coefficient $A_{14}$ | Coefficient $A_{16}$ |
|---|---|---|---|---|
| S1 | −4.876E−06 | 1.296E−07 | −1.879E−09 | 1.296E−11 |
| S2 | −3.705E−05 | 2.095E−05 | −1.554E−06 | 0 |
| S3 | −7.380E−06 | 1.125E−05 | −8.457E−07 | 0 |
| S4 | 3.588E−03 | −4.172E−04 | 7.583E−18 | 0 |
| S7 | 1.349E−04 | 3.716E−09 | 7.383E−16 | 0 |
| S8 | 1.007E−03 | −1.310E−04 | 7.077E−06 | 0 |
| S9 | −5.797E−05 | 1.409E−05 | −1.452E−06 | 0 |
| S10 | −1.230E−04 | 1.922E−05 | −1.037E−06 | 0 |

In the optical lens 400 provided herein, the EFL of the optical lens 400 relative to the visible light is 2.33 mm, the EFL of the optical lens 400 relative to the near-infrared light having the wavelength of 850 nm is 2.342 mm, the F-number is 2.0, the FOV is 90 degrees, the imaging height IH is 2.264 mm, and the TTL is 15.88 mm.

Figure 4B:
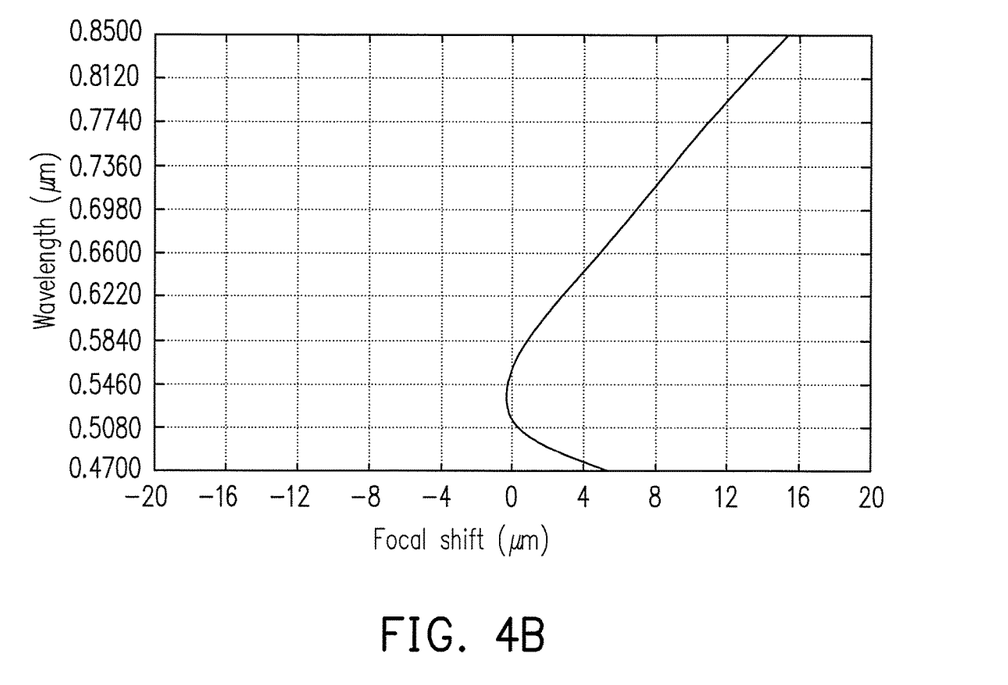
FIG. 4B, FIG. 4C, and FIG. 4D illustrate optical simulation data of imaging of the optical lens in FIG. 4A.
Figure 4C:
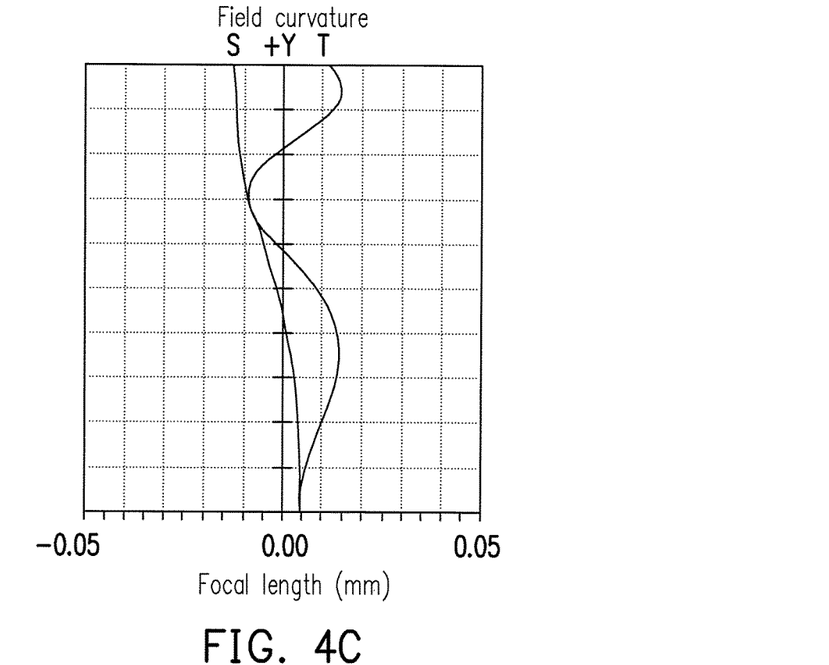
Figure 4D:
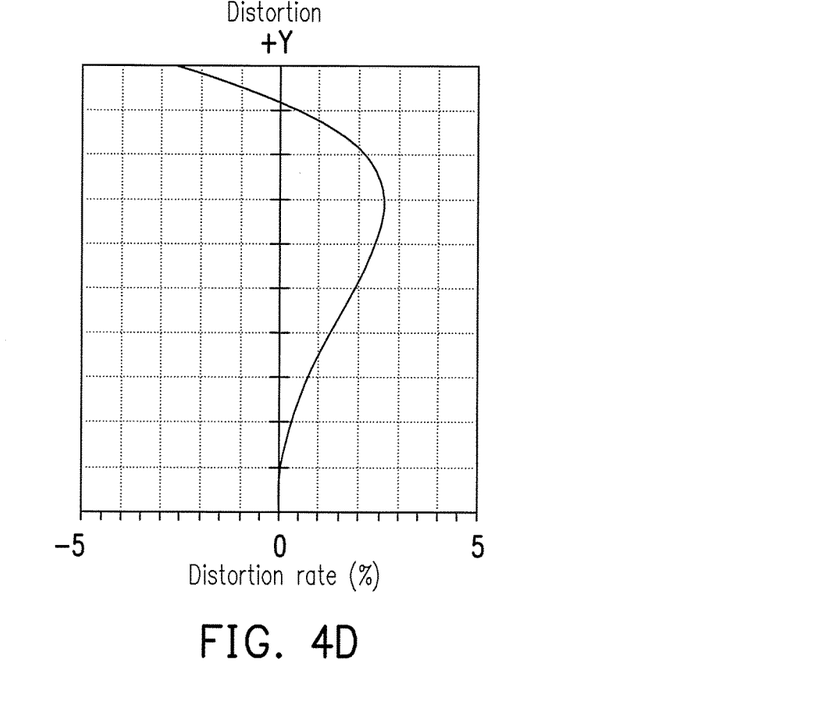

FIG. 4B, FIG. 4C, and FIG. 4D illustrate optical simulation data of imaging of the optical lens 400 in FIG. 4A. In FIG. 4B, the focal shift of the optical lens 400 relative to different wavelengths of light is shown. FIG. 4C and FIG. 4D respectively illustrate graphics of field curvature and distortion simulated with a light having wavelength of 555 nm. The graphics provided in the fourth embodiments as respectively shown in FIG. 1B to FIG. 1D, FIG. 2B to FIG. 2D, FIG. 3B to FIG. 3D, and FIG. 4B to FIG. 4D are within the standard range, and thus the optical lenses 100, 200, 300, and 400 provided in the embodiments of the invention can all satisfy the requirements for low costs, miniaturization, slimness, high resolution capability, large stop aperture, little distortion, 24-hour day and night confocal image-capturing quality, and favorable optical quality.

To sum up, the design of the optical lens provided herein satisfies the predetermined requirements for low costs, miniaturization, slimness, high resolution capability, large stop aperture, little distortion, 24-hour day and night confocal image-capturing quality, and favorable optical quality.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particular exemplary embodiments of the invention does not imply a limitation on the invention, and no such limitation is to be inferred. The invention is limited only by the spirit and scope of the appended claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens comprising:
a first lens group located between a magnified side and a minified side, the first lens group having a negative refractive power and comprising a first lens, the first lens being a plastic aspheric and meniscus lens and having a negative refractive power and a convex surface facing the magnified side;
a second lens group located between the first lens group and the minified side, the second lens group having a positive refractive power and comprising a second lens, a third lens having a negative refractive power, and a fourth lens, every two of the second, the third, and the fourth lenses having an air interval between the every two of the second, the third, and the fourth lenses; and
a stop located between the first lens group and the second lens group,
wherein the optical lens satisfies $2<L/D<4$, L is a total track length of the optical lens, D is a length of a diagonal of an image sensor, an Abbe number of each of at least three of the lenses of the optical lens is greater than 20, a material of at least one of the lenses is glass, and at least one of the lenses is a spherical lens,
wherein the fourth lens has a positive refractive power.

2. The optical lens as recited in claim 1, wherein a surface of the second lens facing the magnified side is a convex surface or a plane.

3. The optical lens as recited in claim 1, wherein the first lens group comprises a fifth lens, and the fifth lens is a biconvex lens or a convex-concave lens.

4. The optical lens as recited in claim 3, wherein the refractive powers of the first lens, the fifth lens, the second lens, the third lens, and the fourth lens are sequentially negative, positive, positive, negative, and positive.

5. The optical lens as recited in claim 3, satisfying one of following conditions: (1) at least three of the first lens, the second lens, the third lens, the fourth lens, and the fifth lens are plastic lenses and (2) the first lens, the fifth lens, the third lens, and the fourth lens are aspheric lenses.

6. An optical lens comprising:
a first lens group located between a magnified side and a minified side;
a second lens group located between the first lens group and the minified side; and
a stop located between the first lens group and the second lens group,
wherein the optical lens satisfies $F<2.5$, $L<20$ millimeters, and 0 millimeter $\leq t<0.02$ millimeter, L is a total track length of the optical lens, F is the F-number of the lens, t is a focal shift of the optical lens relative to a visible light and a near-infrared light having the wavelength of 850 nanometers, and each of the first lens group and the second lens group respectively comprises at least one aspherical lens,
wherein the first lens group has a negative refractive power and comprises at least one lens having a negative refractive power, and the second lens group has a positive refractive power and comprises at least one lens having a positive refractive power.

7. The optical lens as recited in claim 6, wherein a surface of the first lens of the first lens group facing the magnified side is a concave lens.

8. The optical lens as recited in claim 6, wherein the first lens group and comprises a first lens, the second lens group comprises a second lens, a third lens, and a fourth lens, and every two of the second, the third, and the fourth lenses have an air interval between the every two of the second, the third, and the fourth lenses.

9. The optical lens as recited in claim 8, wherein a surface of the first lens of the first lens group facing the magnified side is a concave lens.

10. The optical lens as recited in claim 8, wherein a surface of the second lens facing the magnified side is a convex surface or a plane.

11. The optical lens as recited in claim 8, wherein the first lens group comprises a fifth lens, and the fifth lens is a biconvex lens or a convex-concave lens.

12. The optical lens as recited in claim 11, wherein the refractive powers of the first lens, the fifth lens, the second lens, the third lens, and the fourth lens are sequentially negative, positive, positive, negative, and positive.

13. The optical lens as recited in claim 11, satisfying one of following conditions: (1) at least three of the first lens, the second lens, the third lens, the fourth lens, and the fifth lens are plastic lenses and (2) the first lens, the fifth lens, the third lens, and the fourth lens are aspheric lenses.

14. An optical lens comprising:
a first lens group located between a magnified side and a minified side;
a second lens group located between the first lens group and the minified side; and
a stop located between the first lens group and the second lens group,
wherein the optical lens satisfies $F<2.5$, $L<20$ millimeters, and 0 millimeter $\leq t<0.02$ millimeter, L is a total track length of the optical lens, F is the F-number of the lens, t is a focal shift of the optical lens relative to a visible light and a near-infrared light having the wavelength of 850 nanometers, and each of the first lens group and the second lens group respectively comprises at least one lens made of plastic, wherein the first lens group has a negative refractive power and comprises at least one lens having a negative refractive power, and the second lens group has a positive refractive power and comprises at least one lens having a positive refractive power.

15. The optical lens as recited in claim 14, wherein the first lens group comprises a first lens, the second lens group comprises a second lens, a third lens, and a fourth lens, and every two of the second, the third, and the fourth lenses have an air interval between the every two of the second, the third, and the fourth lenses.

16. The optical lens as recited in claim 15, wherein a surface of the second lens facing the magnified side is a convex surface or a plane.

17. The optical lens as recited in claim 15, wherein the first lens group comprises a fifth lens, and the fifth lens is a biconvex lens or a convex-concave lens.

18. The optical lens as recited in claim 17, wherein the refractive powers of the first lens, the fifth lens, the second lens, the third lens, and the fourth lens are sequentially negative, positive, positive, negative, and positive.

19. The optical lens as recited in claim 18, wherein at least three of the first lens, the second lens, the third lens, the fourth lens, and the fifth lens are plastic lenses.

20. The optical lens as recited in claim 18, wherein the first lens, the fifth lens, the third lens, and the fourth lens are aspheric lenses.

\* \* \* \* \*